Figure 1:
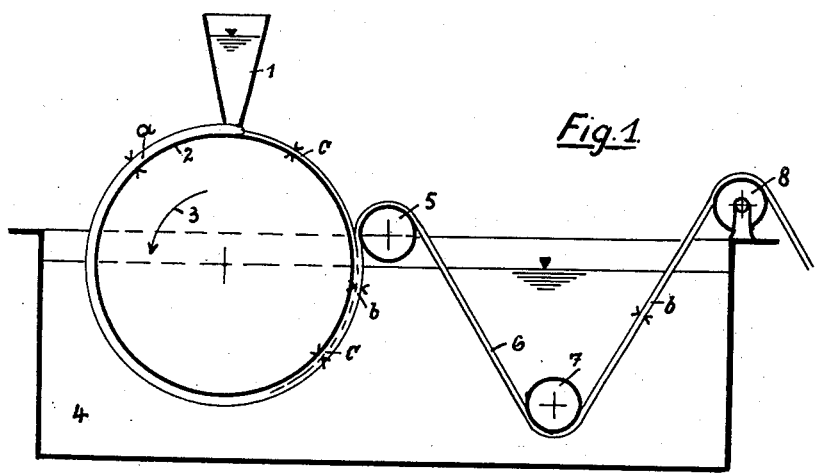

June 7, 1932. M. KÖNIG 1,861,701

MANUFACTURING FILMS AND THE LIKE FROM CELLULOSE SOLUTIONS

Filed July 17, 1930

M. König
INVENTOR

Patented June 7, 1932

1,861,701

UNITED STATES PATENT OFFICE

MAX KÖNIG, OF BOMLITZ, NEAR WALSRODE, GERMANY

MANUFACTURING FILMS AND THE LIKE FROM CELLULOSE SOLUTIONS

Application filed July 17, 1930, Serial No. 468,708, and in Germany July 22, 1929.

This invention has reference to the manufacture of films from solutions of cellulose compounds and the like and it is intended to devise means for obtaining films and foils in a comparatively short time and by a short passage through precipitating baths by which means a sufficient degree of coagulation and solidification is produced to allow of the films or foils being moved through the additional treating liquids, while being kept freely suspended. The invention is intended to substantially improve the process of manufacture and the quality of the products by means of progressively moving supporting members, and it is possible thereby to obtain very uniform products and to control and regulate the thickness thereof. In accordance with previous suggestions relating to the manufacture of partly coagulated films and the like the cellulose solutions were caused to flow directly from a funnel-shaped pouring device into the precipitating bath, so that the layer produced is acted upon both of its sides by the precipitating agent from the moment it leaves the pouring member. The sheet or film produced in this manner is however still very sensitive against mechanical influences, so that it requires a large number of closely adjacent rollers to guide it into and through the succeeding treating baths. In accordance with another suggestion the necessity of using a plurality of guide rollers of this kind is avoided by causing the cellulose solution to flow from the pouring means directly onto a casting support which has been previously wetted with the precipitating agent, the supporting means being moreover partly immersed in the precipitating bath through which the layer of cellulose solution obtained is caused to pass. With these modes of operation there is the objectionable feature that it is very difficult to uniformly wet the supporting means or carrier with the precipitating agent, and in view thereof it has also been proposed to separate the layer of cellulose passing through the precipitating bath from the advancing carrier or support at such time in which the layer has become sufficiently solidified into a film, foil or sheet of substantially resisting qualities against mechanical action, while the precipitating agent itself has permeated the layer by diffusion, but has not yet come in wetting contact with the carrier, so that this carrier or support remains always dry. With this method however the rate of manufacture is confined to certain limited periods of time which have to be strictly adhered to.

Now in the course of my experiments it has been ascertained that the problem may be solved in a very simple and effective manner by using a movable casting support or carrier which is partially immersed into the precipitating bath, care being taken to have the carrier covered wtih cellulose solution throughout its entire periphery. This result is accomplished according to this invention by causing the solution which is applied to the carrier or casting support to become coagulated only down to a certain depth of the layer produced, the resulting coagulated part of the film being separated from the remaining layer which latter is left permanently upon the casting support. The separated coagulated film may then be freely suspended and may be passed in this condition through the additional treating baths, while fresh portions of cellulose solution are caused to flow continuously from the pouring means onto the remaining layer on the casting support. By severing the film from its carrier before the precipitating bath has become diffused through the entire layer down to the carrier itself there remains an uncoagulated layer of cellulose solution which coats the casting support, and it thereby becomes possible to avoid the difficulties presented by the previous suggestions for the manufacture of cellulose films in which difficulties arose from the necessity of a uniform wetting of the casting support or carrier with the precipitating means or from the fact that the carrier or casting support had to be kept dry in conformity with an accurate timing procedure, there being moreover the additional inconvenience of numerous rollers being necessitated for the guiding of the film.

In accordance with the process of this invention films or foils of great uniformity in every respect throughout their entire surface and thickness may be obtained even in the case of the manufacture of endless films of very small thickness, as for instance a thickness of 20μ. It has been ascertained in this connection that the diffusion of the precipitating agent into the layer of cellulose solution occurs throughout in a perfectly uniform manner, and on the other hand the separation of the coagulated film from the residual, non-solidified layer remaining upon the casting support or carrier is effected in a faultless manner so that the film shows an absolutely smooth and uniform surface even upon its separated side. In view of the fact that the casting support is permanently coated with a layer of cellulose solution, there is no possibility of irregularities of the surface being impressed and shown upon the detached film or foil, and at the same time the casting surface is protected from contact with the chemically acting precipitating agents. There is the additional advantage moreover that the efficiency and the facility and economy of manufacture of the new film-producing process are greatly increased in view of the rapid coagulation of the film obtained according to this invention.

It is of importance to provide means for a continuously uniform rate of renewal and of supplying the precipitating bath. The regulation of the thickness of the film to be produced is obtained by displacing or changing the point of separation of the film at the casting support or carrier or by varying the velocity of movement of the casting support, inasmuch as the thickness of the coagulated film layer will be the more reduced the more rapidly the separation of the film from the remaining layer is effected and in proportion with the rapidity of movement of the casting support. With the same end in view it is also admissible to change the concentration or the acidity of the precipitating bath, so that the depth of the coagulation may be increased or reduced for the same length of film. Inasmuch as the rapidity of coagulation depends upon the temperature of the cellulose solution and of the precipitating bath, the thickness of the films or sheets to be produced may also be regulated by a corresponding variation of the temperature of the cellulose solution or of the precipitating bath or by a combination of regulating the conditions of the cellulose solution and of the precipitating bath. Thus for instance there is an increase in the velocity of the diffusion of the precipitating agent into the layer of the solution of cellulose as a result of the increase of temperature of the cellulose solution and of the precipitating bath, whereby a thicker film or foil may be obtained. Another possibility of controlling and regulating the thickness of the films or foils is afforded by the changing of the thickness of the layer of cellulose solution which is allowed to flow upon the casting support or carrier.

The invention will be more particularly described by reference to the accompanying drawing which shows by way of exemplification and diagrammatically an apparatus for carrying out the method referred to, in elevation and in two forms of embodiment in Figures 1 and 2 of the drawing.

Figure 2:
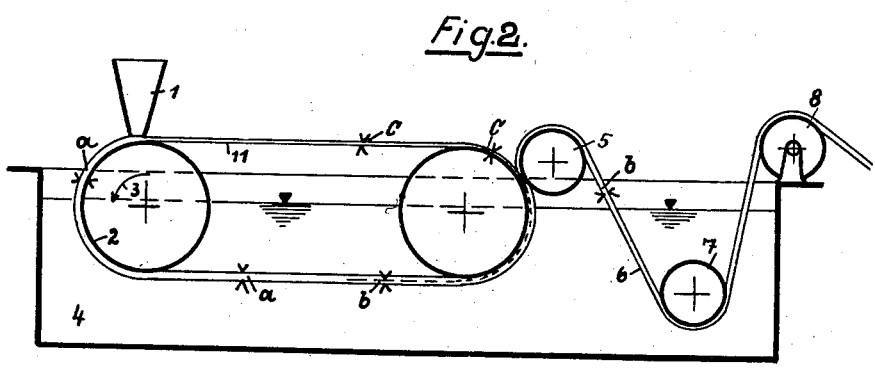

In accordance with the arrangement shown in Fig. 1 the cellulose solution intended for the manufacture of films or foils is allowed to flow from the preferably slotted nozzle of the caster or pouring member 1 onto the drum 2 which serves as a casting support or carrier, this drum 2 being continuously rotated in the direction of the arrow 3 and being partially immersed into the precipitating bath 4. As soon as the layer of cellulose solution which is applied to the drum 2 and the total thickness of which is indicated at $a$ has become coagulated to a certain depth $b$ which corresponds to the thickness of the film or foil to be produced and which is indicated by dotted lines in Fig. 1 of the drawing, this coagulated sectional part of the layer is detached by means of the roller 5 and is made to pass as a freely suspended web 6 of the thickness $b$ over the guide rollers 7 and 8, and after it has left the precipitating bath 4 it is fed to the additional otherwise known treating baths. Upon the drum 2 there will then remain an uncoagulated residual layer of a thickness $c$ equal to the difference of the two thicknesses $a$ and $b$, and upon which the cellulose solution discharged from the caster 1 is caused to flow. Instead of using the drum I may also use an endless ribbon or band 11 as a support, as appears from Fig. 2 which is otherwise identical with the arrangement of Fig. 1. In accordance with the velocity of the progressing casting support or carrier 2 or 11 and with the thickness $a$ of the layer of cellulose delivered from the caster 1 and in conformity with the concentration of the precipitating bath 4 and the distance between the stripping roller 5 from the caster 1 the thickness $b$ of the caoagulated film which is detached from the casting support will be different, so that it is possible to control and vary and adjust this thickness according to requirements by regulating one or several or all of the conditions hereinbefore enumerated. Instead of a solution of cellulose compounds I may also employ any other compositions or masses which may be solidified in a similar manner by precipitating or coagulating agents as the starting solutions for the manufacture of films and foils according to this invention.

*Examples*

1. From the caster 1 shown in Fig. 1 of the drawing a solution of viscose is caused to flow upon the casting drum 2 which is rotated with a peripheral speed of 20 meters per minute and which has a diameter of two meters. The solution of viscose contains 6.5% of cellulose and 6.5% of alkalis and the degree of chloride of ammonia-maturity of which is 10. The coagulating bath 4 consists of an acid solution of salt, containing 5% sulphuric acid and 20% sodium-sulphate. Under these conditions the precipitating bath, with the drum 2 being half-immersed into the bath, permeates the layer of viscose applied to the casting drum to such an extent that this layer is thoroughly coagulated for half of its thickness during its passage through the precipitating bath. By means of the roller 5 the coagulated layer the thickness $b$ of which amounts to half the original thickness $a$ is detached and is then guided through the additional treating liquids while being kept freely suspended upon suitable carrying means.

2. By means of the pouring funnel 1 shown in Fig. 2 of the drawing the endless ribbon 11 is coated with a solution of nitrocellulose in ether-alcohol, so that a layer of 2 millimeters thickness is obtained. The solution contains 15% nitro-cellulose and 5% camphor as a softening agent. The ribbon is moved through the coagulating bath 4 into which it is half immersed at a peripheral speed of 1 millimeter per minute. The bath consists of sulphuric acid of 30%. With this kind of procedure the precipitation of the solution of cellulose takes place to such an extent that the remaining layer $c$ constitutes two-thirds of the layer $a$ originally applied. The coagulated film ribbon is detached from the ribbon 11 by means of the stripping roller 5 and is conducted to the further treating stages, while remaining freely suspended.

The practical carrying out of applicant's process has shown that the line of demarkation between the solidified layer $b$ and the non-solidified film layer $c$ on the drum, indicated by the curved dotted line in Figure 1, always remains the same if the speed of the drum, the concentration of the precipitating bath and the speed of discharge of the solution from the caster are kept constant. The inner layer $c$ constantly remains uncoagulated and liquid and is always formed by solvent. Since the line of demarkation between the film layers $b$ and $c$ always remains the same, a uniform product is constantly obtained.

Moreover, by means of the stripper roll 5 alone without using a doctor knife, a uniform and thorough separation of the solidified film layer $b$ from the inner layer $c$ is always effected without residues or strips of the layer $b$ remaining on the layer $c$. A solidification of the inner layer $c$ is prevented in that new cellulose solution is always applied to the inner layer $c$ from the caster whereby this layer $c$ is constantly protected against solidification. Any irregularity of the inner layer $c$ will also be immediately equalized by the new cellulose solution flowing from the caster because the same solution is used for this layer $c$ as for the layer $b$ to be detached. Applicant's process has proved satisfactory in practice and produces absolutely faultless uniform transparent films.

It should be understood that the invention is not confined to the embodiments shown herein by way of exemplification and illustration, but it may be modified within the scope of the appended claims.

I claim:—

1. The method of manufacturing films and other sheet-like materials from cellulose compounds and other coagulable liquids which comprises applying a layer of a solution of said compounds and liquids onto a carrier, superficially coagulating said layer to a certain thickness, detaching the coagulated portion from the uncoagulated portion of the layer and applying fresh quantities of the solution and liquids to the uncoagulated portion and coagulating and solidifying additional superficial portions of the resulting ribbon-like layer.

2. The method of manufacturing films and other thin sheet-like materials from cellulose solutions and other coagulable liquids which comprises spreading such solutions and liquids into a sheet-like layer of liquid, coagulating the exposed superficial part of said layer and detaching said coagulated part from the uncoagulated liquid portion and applying new quantities of solidifiable solutions onto said uncoagulated portion as a base.

3. The method of manufacturing film and other thin sheet-like material from coagulating and solidifiable liquids which comprises spreading such liquids into a sheet-like layer, coagulating the exposed outer portion thereof and varying the temperature of the solution and the thickness of the layer, acting thereupon with precipitating solutions and detaching the superficially solidified portion from the underlying liquid base portion of the layer.

4. The method of manufacturing films and other thin sheet-like material from coagulating and solidifiable liquids which comprises spreading said liquids into sheet-like layers, acting upon the surface of the layers with precipitating agents, varying the temperature of the precipitating agents and thereby changing the depth of precipitation and solidification of the layers and detaching the longitudinally extending solidified section of the layers from the still liquid section thereof.

5. The method of manufacturing films and other thin sheet-like material from cellulose solutions and other coagulable and solidifiable liquids, which comprises spreading such solutions and liquids into a sheet-like layer of liquid, precipitating and solidifying the exposed outer longitudinal section of the layer, separating this solidified outer section and varying the point of separation and thereby modifying the thickness of the solidified section.

In testimony whereof I affix my signature.

MAX KÖNIG.